(12) United States Patent
Freeman

(10) Patent No.: US 6,231,136 B1
(45) Date of Patent: May 15, 2001

(54) CRAWLER SPROCKET DRIVE GUARD

(76) Inventor: Ernie Freeman, 3467 Kings Mill Run, Rocky River, OH (US) 44116

( * ) Notice: Subject to any disclaimer, the term of this patent is extended or adjusted under 35 U.S.C. 154(b) by 0 days.

(21) Appl. No.: 09/324,666

(22) Filed: Jun. 3, 1999

(51) Int. Cl.[7] ................................................. B62D 25/16
(52) U.S. Cl. ................................................................ 305/107
(58) Field of Search ................................. 305/110, 100, 305/107, 109, 115; 404/129; 172/610

(56) References Cited

U.S. PATENT DOCUMENTS

| | | | |
|---|---|---|---|
| 1,812,543 | * 5/1931 | White | 305/107 |
| 2,146,882 | * 2/1939 | Baker et al. | 305/109 |
| 3,861,762 | * 1/1975 | Freedy et al. | 305/100 |
| 3,912,336 | * 10/1975 | Ritter, Jr. et al. | 305/100 |
| 5,713,644 | 2/1998 | Freeman | 305/110 |
| 5,733,020 | * 3/1998 | McCartney et al. | 305/110 |
| 5,820,230 | * 10/1998 | Freeman | 305/107 |
| 5,951,123 | * 9/1999 | Bomstad et al. | 305/107 |
| 6,019,443 | * 2/2000 | Freeman | 305/100 |

* cited by examiner

Primary Examiner—S. Joseph Morano
Assistant Examiner—Long Bao Nguyen
(74) Attorney, Agent, or Firm—Pearne & Gordon LLP

(57) ABSTRACT

A guard for off road vehicles to protect the final drive area from debris which otherwise causes destructive abrasion and seal failure and particularly suited for the final drive of a track chain sprocket on a crawler. The guard encloses the space surrounding the final drive spindle housing and seal between the housing and a hub on which the sprocket is mounted. The guard can be safely installed on existing machines without disassembly of major parts of the final drive.

14 Claims, 5 Drawing Sheets

CRAWLER SPROCKET DRIVE GUARD

BACKGROUND OF THE INVENTION

The invention relates to improvements for land vehicles such as off road equipment and, in particular, to guards for the drive of wheels or sprockets for the same.

U.S. Pat. No. 5,713,644 illustrates a cutter device to reduce wear and tear on the final drive of a crawler such as manufactured Caterpillar, Inc. This cutter device is especially useful on machines operating on landfills that accept residential and commercial refuse, for example. Landfill environments present severe service conditions on machinery due to the mix of debris typically found at such sites. Material over which a machine runs tends to be drawn up and around rotary parts eventually leading to excessive wear through abrasion and oftentimes to catastrophic failure because of destruction of seals between parts rotating relative to one another. A need exists for a device that can protect drive areas of equipment of the type described in landfills, construction sites and other off road situations where the environment is adverse and that provides an alternative to the cutter device disclosed in the aforementioned patent for situations that are less than extreme.

More specifically, rotating drive wheels in the form of track chain sprockets, for instance, rotate relative to their support housings and normally have associated seals to protect bearings and gears within the housings that support the sprocket hubs for rotation. The housings are subject to high wear rates through abrasion by debris entwined on the rotating parts. This debris eventually can wear through the walls of the housing causing catastrophic failure of bearings and related parts.

Where a seal on a final drive of a crawler is damaged prematurely by intrusion of debris, the cost to repair the same may range, by way of example, between $3,000 to $4,000. Wear on a final drive housing or sprocket hub can cost as much as $7,000 to $8,000 in repair. A loss of oil from a damaged seal can result in repair work for internal damage of as much as $50,000.

It is desirable, especially for large machines where the major drive components are too heavy to be manipulated by hand, that any protective guard be capable of being installed without dismantling and reinstalling such major components of the machine.

SUMMARY OF THE INVENTION

The invention provides a guard for drive assemblies of commercial land vehicles such as track mounted machines sometimes referred to as crawlers. Chain sprockets for the track are rotatably supported on housings at opposite sides of a crawler. In the disclosed embodiment, the guard extends between a fixed housing on the main body or frame of the machine and the hub supporting a track chain sprocket. The guard preferably has a relatively large diameter so it occupies most of the space available adjacent the path of the track chain. This geometry advantageously limits the amount of debris that can accumulate on the sprocket adjacent the rotating areas.

An important aspect of the invention is the ability of the guard to be installed on a machine without requiring disassembly and reassembly of major parts of the final drive system. The disclosed guard shares the original mounting bolt locations of the drive system but is configured to allow at least some of the mounting bolts to remain in place at locations circumferentially spaced around the axis of rotation of the sprocket while the guard is being installed. This feature ensures that various drive line parts will be safely held in place without being stressed in a manner that could cause physical damage or even bodily injury.

Another important feature of the invention is the provision of telescoping parts that enable the entire gap between the housing and sprocket to be protected from entry of debris. The telescoping guard portions in the illustrated embodiment have a labyrinth-like configuration which reduces the risk that debris could work its way into the guard.

DESCRIPTION OF THE PREFERRED EMBODIMENTS

Figure 1:
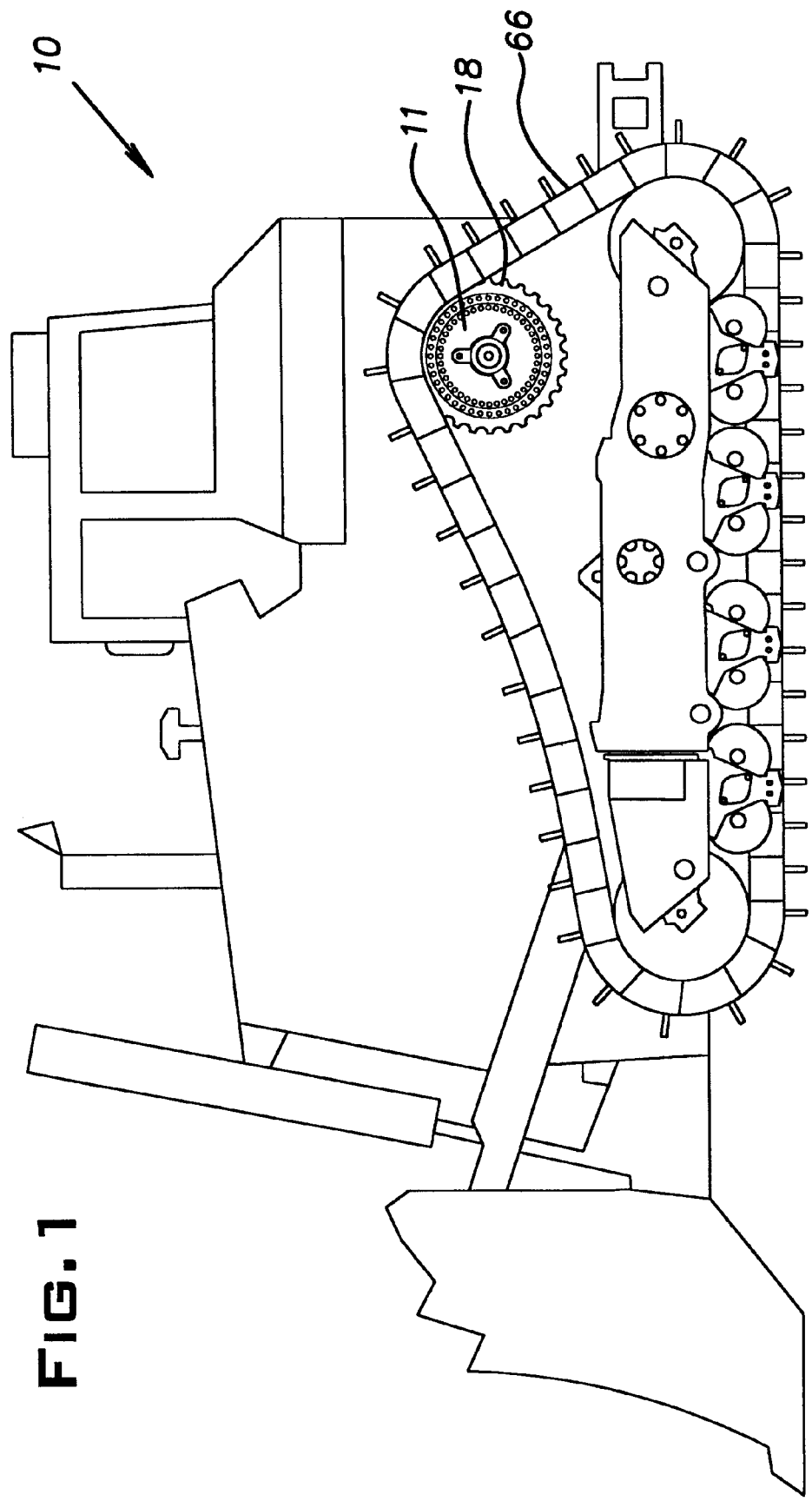
FIG. 1 is a somewhat schematic side elevational view of a track mounted machine or tractor embodying the invention.
Figure 2:
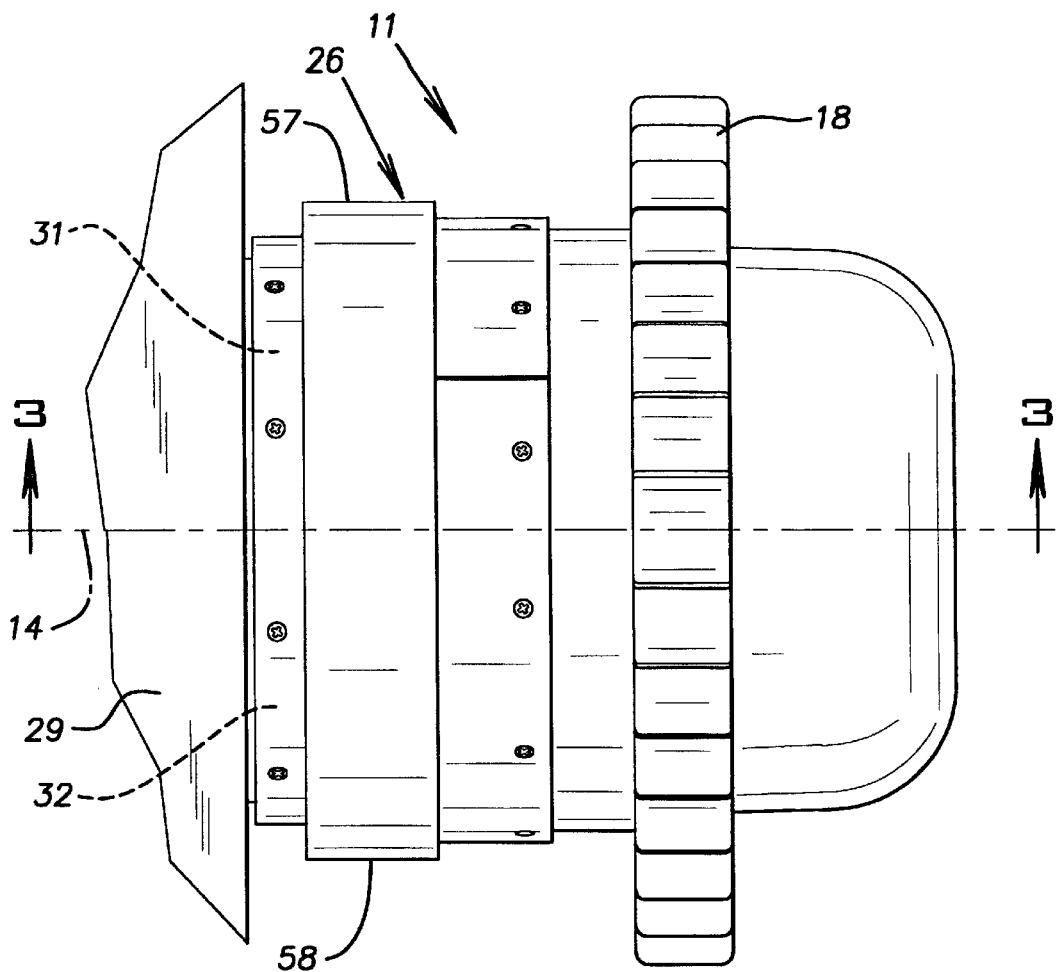
FIG. 2 is a fragmentary elevational view, taken from the rear, of the final drive system of the right side of the tractor protected by the guard of the invention.

Referring now to the drawings and in particular to FIG. 1, there is shown a land vehicle 10 in the form of a track mounted machine or crawler. The illustrated machine can represent the type of crawler design manufactured by Caterpillar, Inc. and referred to as a High Drive model. The machine 10 is of a known construction and has a prime mover, typically a diesel engine, and a drive train which includes a pair of final drives 11 represented by a spindle housing 12 and a hub assembly 13 on each side of the machine 10. The hub assembly 13 rotates about an axis 14. The non-rotating spindle housing 12 is a circular bell-shaped structure that is fixed on the machine frame, designated 29, by bolts 16. The bolts 16 are generally evenly spaced in a circular pattern concentric with the axis 14 and extend through a flange 17 of the housing 12.

The hub 13 carries a sprocket 18 that is in the form of a plurality of arcuate segments 19. The sprocket segments 19 are fixed to a flange 21 of the hub 13 by a plurality of bolts 22. The bolts 22 are assembled axially through holes in the segments 19 and the hub flange 21 generally evenly spaced about the circumference of the hub. The end of an extension 23 of the hub 13 lies adjacent the housing 12 and a seal assembly generally indicated at 24 and known in the art is disposed between these elements to accommodate rotation of the hub 13 with its extension 23 relative to the housing 12 while sealing lubricant in these parts and excluding environmental debris, dust, water and the like.

The invention provides a guard 26 which in a preferred embodiment is fabricated as a weldment of steel plate and bar. The guard 26 includes two generally circular base portions 27, 28. An inboard base portion 27 is associated with the spindle housing 12 and frame 29 of the machine 10 while the outboard base portion 28 is associated with the rotating sprocket 18 and hub 13. Both the inboard and outboard base portions 27, 28 are split approximately in halves for purposes of installation.

The inboard guard base portion 27 has mating semicircular halves 31, 32. The halves 31, 32, have their main bodies 30 rolled from steel plate stock and have an internal semi-circular radial flange 33 spaced a predetermined distance away from an associated end 34. Each flange 33 has holes 36 that align with mounting holes in the housing flange 17. On the external face of the flange 33 are welded or otherwise fixed a plurality of apertured spacers 37 in registry with the holes 36. The spacers 37 are at least as long in the axial direction as the heads of the bolts 16 mounting the spindle housing 12. The holes in the flange 33 and spacers 37 are sized to receive bolts of the same diameter as the bolts 16 mounting the spindle housing 12.

Figure 5:
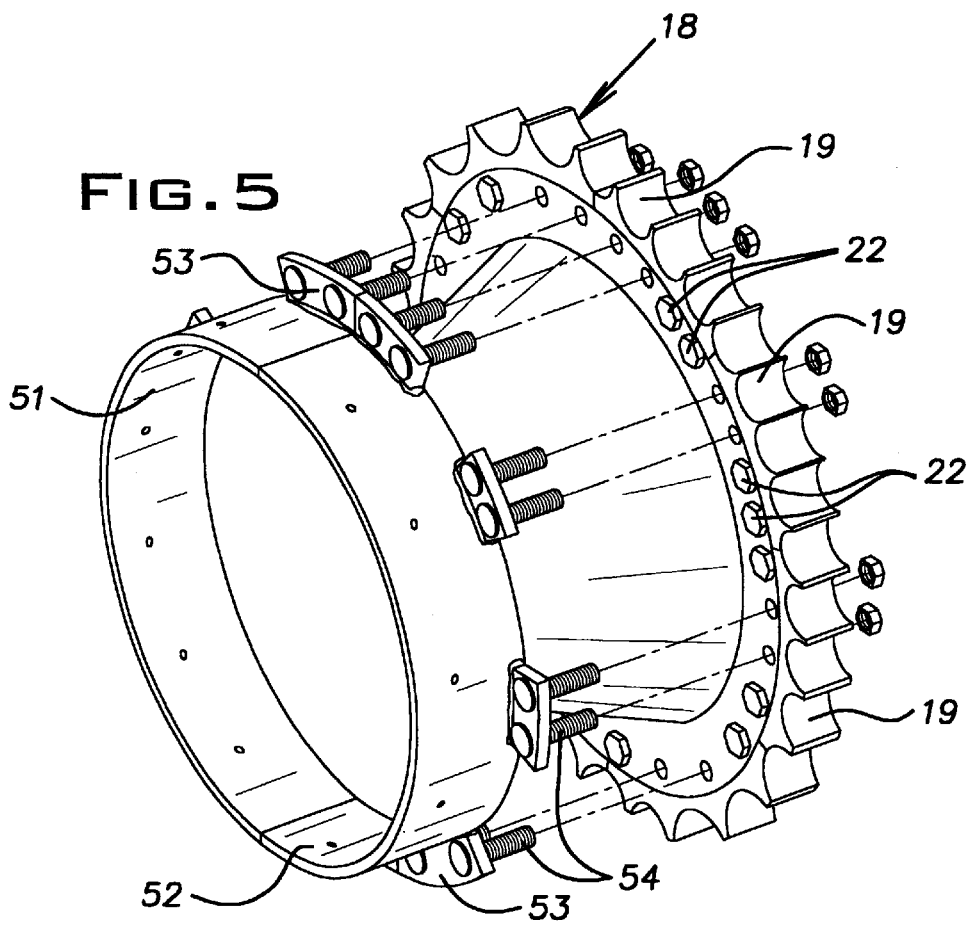
FIG. 5 is an exploded perspective view of an outboard base portion of the guard mounted with the rotating parts of the final drive system.

FIG. 5 illustrates details of the generally cylindrical outboard base portion 28 which is comprised of two similar mating half shells 51, 52 fabricated primarily of steel plate. At their outer ends, the shells 51, 52 have external radial flanges or brackets 53 that are located at pre-determined spaced locations about the periphery or circumference of the guard base portion 28. The flanges 53 have bolts 54 that align with holes in the hub flange 21 used to mount the sprocket segments 19. The bolts 54 have shallow heads for clearance of the track chain and are preferably welded to the flanges 53.

Figure 6:
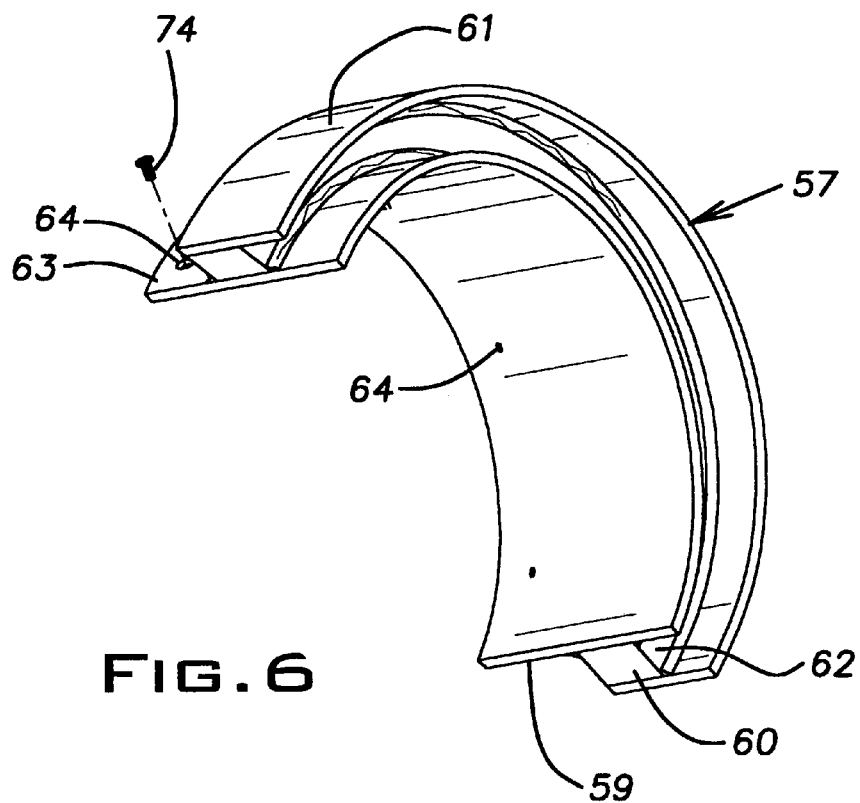
FIG. 6 is a perspective view of an inboard shield half section.
Figure 7:
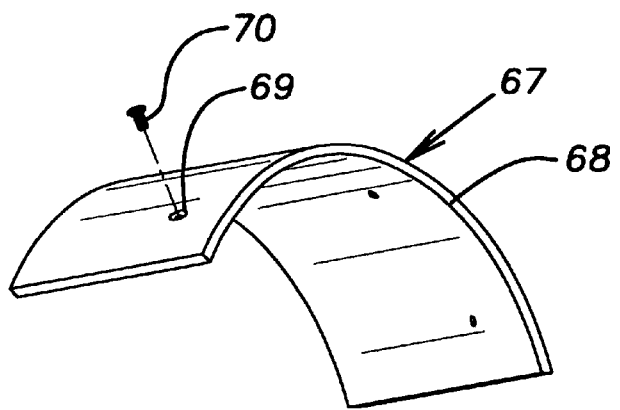
FIG. 7 is a perspective view of an outboard shield plate.

The guard includes an inboard shield 56 conveniently formed as a mating pair of similar generally semicircular parts 57, 58. These parts 57, 58 have the same cross section when viewed in a plane parallel to the axis 14 as in FIG. 3. One of the parts 57 is illustrated in FIG. 6 and includes an inner semi-cylindrical steel plate 59, a spacer bar 60 rolled into a semi-circular shape and a semi-cylindrical outer steel plate 61. These pieces 59–61 are welded together so that the outer plate 61 is radially outward of and concentric with the inner plate 59 and a cylindrical groove 62 is formed between these plates. An inboard side of the inner plate 59 extends axially away from the bar 60 and the outer plate 61 leaving its outer surface area 63 uncovered. A plurality of circumferentially spaced countersunk holes 64 are formed in the inboard side of the inner plate 59 through the surface 63. The holes 64 are located so that they can be aligned with threaded holes 65 in the inboard base portion 27. Flat head socket type bolts 74 are assembled flush in these holes 64, 65 to retain the shield parts 57, 58 on the inboard base portion 27. The inner surface of the inner plate 59 has a radius substantially equal to the outer radius of the base portion 27.

The guard 26 has an outboard cylindrical shield 67 made of a plurality of steel plates 68. The plates 68 have plain cylindrical segment configurations and an inside radius substantially equal to the outside radius of the outer surface of the outboard base 28. These shield plates 68 have countersunk holes 69 that align with threaded holes 72 in the outboard base portion 28 and receive bolts that retain the plates in place on the outboard base. The bolts 70 can be flat head socket type fasteners that fit with their heads flush in the countersunk holes 69.

The guard 26 is provided over the final drive 11 on each side of the machine 10. The disclosed guard 26 has the ability to be safely installed without disassembly of the track, designated 66, sprocket 18 or hub 13. The inboard guard base portion 27 is assembled by first removing a limited number of bolts 16 that mount the spindle housing 12 to the machine frame 29 leaving at least about half of these bolts in place generally evenly distributed about the circumference of the housing 12. The particular bolts 12 that are removed are determined by the positions of the spacers 37, the bolts being removed where the spacers exist. The base portion halves 31, 32, are put in position and longer substitute bolts 71 are assembled through the flanges 33, spacers 37 and spindle housing flange 17 and are suitably tightened.

The outboard guard base portion 28 is installed in place after the inboard base portion 27 is installed as just described. A limited number of sprocket segment mounting bolts 22 at locations around the sprocket 18 are removed. The bolts 22 are removed at locations corresponding to the flanges 53 and bolts 54 on the shell halves 51, 52. Nuts on the outside of the sprocket segments 19 are suitably tightened onto the bolts 54. It will be seen that the flanges 53 and bolts 54 are arranged to leave at least about half of the original bolts 22 in place distributed around the circumference of the sprocket so that the sprocket segments 19 are safely held in place during this installation process.

The inboard shield 56 is mounted on the inboard base 27 and retained, as indicated above, by the bolts 74. The bolt holes 64, 65 are arranged to permit the joints between the shield halves 57, 58 to be angularly spaced from the joints between the base halves 31, 32 so as to rigidify this assembly. Thereafter the outboard shield plates 68 are mounted on the outboard base 28 with portions received in the annular groove 62. The respective holes 69 in the plates 68 are arranged relative to the holes 72 in the outboard base such that the joints between them are angularly displaced from the joints between the base halves 51, 52 thereby rigidifying this assembly.

Figure 3:
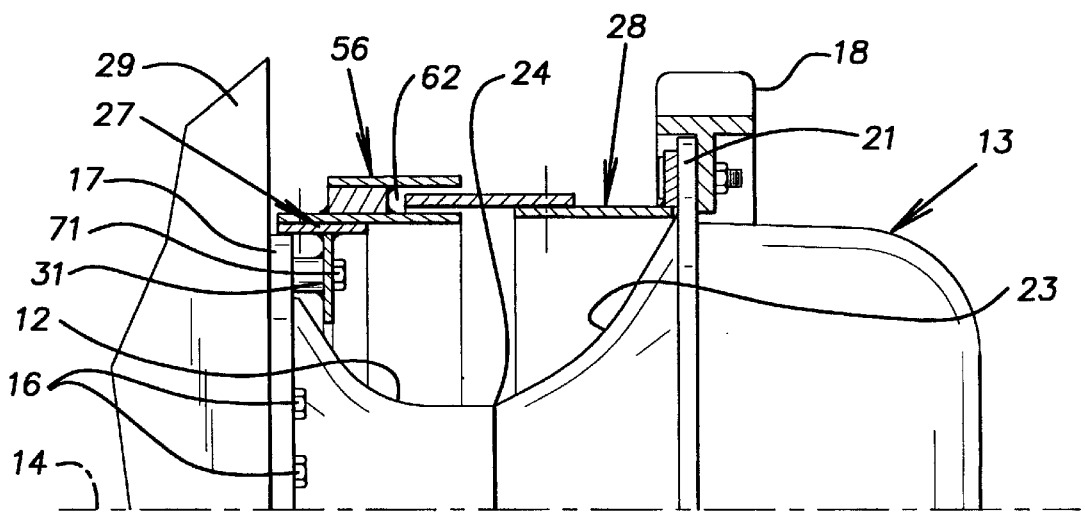
FIG. 3 is a cross sectional partial view of the guard of the invention taken in a vertical plane parallel to the rotational axis of the track chain sprocket.
Figure 4:
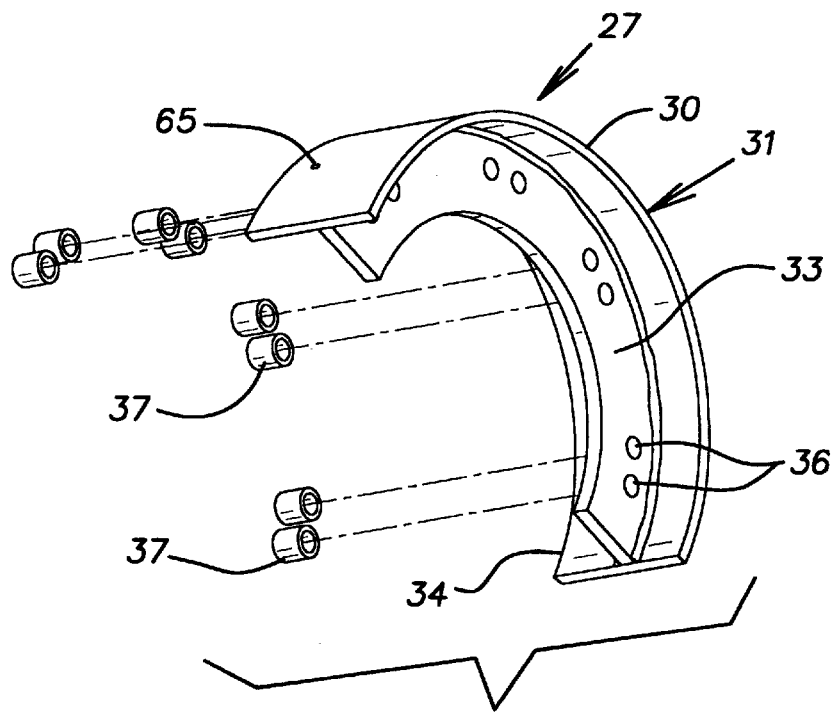
FIG. 4 is an exploded perspective view of an inboard base portion of the guard associated with a non-rotating spindle housing part of the final drive system.

With particular reference to FIG. 3 it will be seen that the assembled guard 26 completely envelopes the annular space between the spindle housing 12 and the sprocket 18. The guard 26 protects the final drive 11 in several ways. It substantially closes off this annular area making it impossible for any large quantity of debris to be entrained with the sprocket or wheel 18. The housing 12 is shielded from abrasion which otherwise occurs when entrained debris rotates with the hub assembly 13 and sprocket 18. Such abrasion can eventually result in destruction of the housing 12 and major repair costs. Importantly, the guard 26 prevents strand-like material such as cable, wire, rope, strapping or even vine-like vegetation from finding its way into the seal assembly 24 between the housing 12 and hub extension 23 where it can ruin the seal with catastrophic results to the internal parts of the drive. The telescoping relation of the inboard and outboard shields 56, 67 at the groove 62 presents a serpentine or labyrinth path to effectively block the passage of any foreign objects tending to be directed towards the annular area enclosed by the guard 26. Where the guard 26 is exposed to a particularly hostile environment the shields 56, 57 may be eventually consumed by abrasion but this is preferable to destruction of the housing 12 or seal assembly 24 since these elements can be easily removed and replaced with new units at significantly less cost. Steel bands, not shown, can be suitably fastened around the rows of bolts 70, 74.

Figure 8:
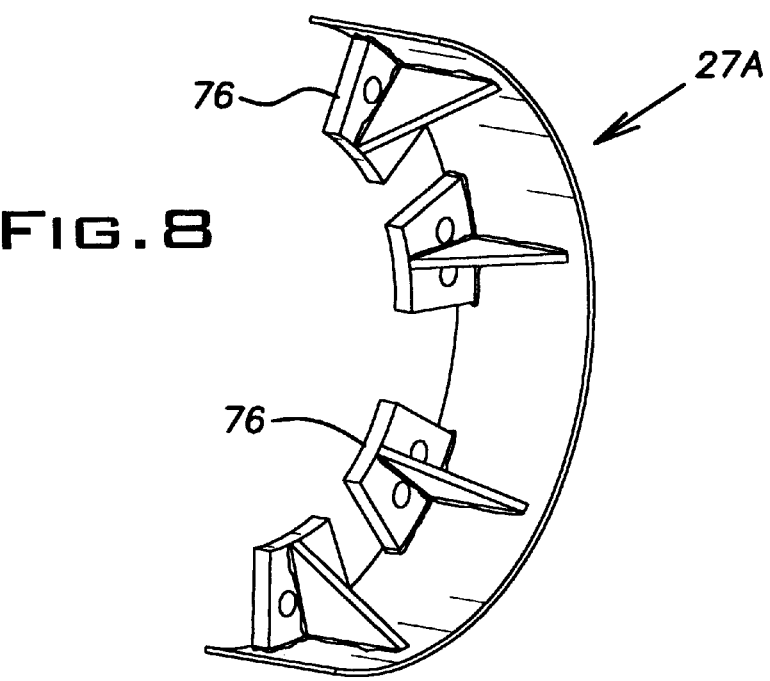
FIG. 8 is a fragmentary perspective view of a modified form of an inboard base portion associated with the non-rotating housing part of the final drive system.

An alternative construction of the inboard guard base portion 27A is illustrated in FIG. 8. In this arrangement, the flange 33 is replaced by a plurality of relatively short arcuate brackets 76. Original bolts holding the housing 12 to the machine frame 29 at the locations of the brackets 76 are removed. With the modified guard base portion 27A in place substitute somewhat longer bolts are assembled through holes in the brackets 76 into the machine frame.

Figure 9:
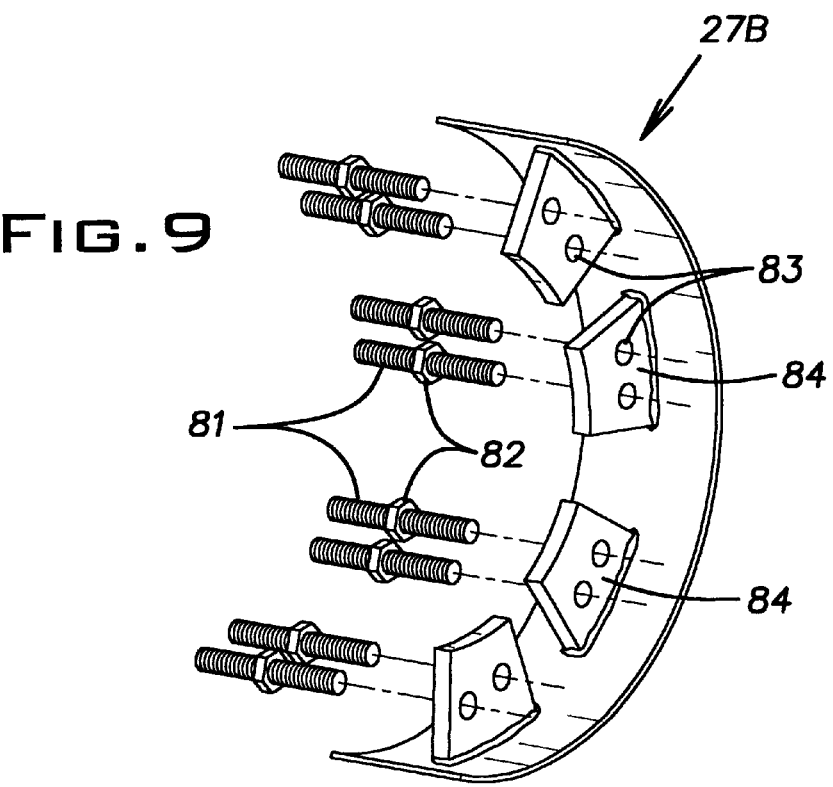
FIG. 9 is a perspective view of specialized bolts used with still another form of an inboard base portion of the guard of the invention.

FIG. 9 illustrates still another variant of the invention where special bolts 81 are substituted for the original bolts 16 mounting the housing 12. The bolts 81 are threaded on opposite sides of a central hex head 82. The bolts 81 are tightened onto the housing and thereafter the inboard guard base portion 27B is installed by assembling it so that the ends of the special bolts 81 extend through holes 83 in a flange 84 and nuts are thereafter tightened onto these ends. It will be understood that as many as all of the original housing mounting bolts 16 can be exchanged with the double ended bolts 81 where a suitable number of holes 83 are provided in the inboard guard portion flange 84. The substitution of bolts can be done one or a few at a time so that the static forces on the housing 12 are safely held by the remaining bolts.

It will be understood that when either guard base portion 27 or 28 is being assembled, a large number of the original bolts 16, 22 are left in place at circumferentially spaced locations on the housing 12 or hub assembly 13. In all cases, bolts holding the housing 12 or sprocket 18 in place will preferably exist at spaced locations in an arc greater than 1800 on either of these circular elements.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A guard assembly for a land vehicle such as a crawler, having a driven wheel adapted to rotate about an axis and extending from a non-rotating wheel supporting part that is bolted to an inboard section of the machine and having a seal area between a part rotating with the wheel and the non-rotating part comprising a hollow metal cover extending between and around the non-rotating and rotating parts to protect said parts and said seal area from abrasion and intrusion of debris, the cover being fixed to one of said rotating and non-rotating parts by a plurality of cover mounting bolts arranged circumferentially about said one part with reference to said axis, the cover and mounting bolts being constructed and arranged to permit the cover to be mounted on said one part while allowing said non-rotating part to remain bolted to said inboard section by a plurality of bolts distributed circumferentially about said non-rotating part.

2. A guard as set forth in claim 1, wherein said cover is bolted to the non-rotating part with said mounting bolts.

3. A guard as set forth in claim 1, wherein said cover includes inboard and outboard portions, the inboard portion being bolted to the non-rotating part and the outboard portion being bolted to the rotating part.

4. A guard as set forth in claim 3, wherein the cover includes elements bridging between the non-rotating and rotating parts in a telescoped relation that presents a convoluted path for resisting ingress of debris into the cover.

5. A final drive guard for a crawler-type land vehicle having final drive assemblies on opposite sides of the vehicle, each final drive including a non-rotating spindle housing bolted to the frame of the vehicle and a rotating hub outboard of and rotatably supported by the spindle housing and with a track chain sprocket bolted to it, the guard comprising inboard and outboard portions, the inboard portion being arranged to be bolted to the machine frame with bolts that also serve to mount the spindle housing to the frame, the outboard portion being arranged to be bolted to the hub with bolts that also serve to mount the sprocket on the hub, the inboard and outboard portions being constructed and arranged to exclude debris from an area they mutually enclose between the spindle housing and the hub.

6. A guard as set forth in claim 5, wherein said portions each comprise half shell elements that mate with one another when installed in place on a vehicle.

7. A guard as set forth in claim 6, wherein said inboard portion has a base arranged to be bolted in place while a plurality of original bolts mounting said spindle housing remain in place in an arcuate pattern extending over an arc greater than 180°.

8. A guard as set forth in claim 7, wherein the inboard portion includes spacer elements having a thickness at least as great as the height of the heads of the bolts that originally hold the spindle housing on the frame.

9. A guard as set forth in claim 6, wherein said outboard portion has a base arranged to be bolted in place while a plurality of original bolts mounting said sprocket to said hub remain in place in an-arcuate pattern extending over an arc substantially greater than 180°.

10. A guard as set forth in claim 6, wherein said inboard and outboard portions includes parts that are telescoped with one another.

11. A guard as set forth in claim 10, wherein the telescoped relation between said inboard and outboard parts includes a labyrinth-type seal.

12. A guard kit for retrofitting the final drive of a crawler having on each side of the vehicle a spindle housing bolted to the vehicle frame, a hub rotatably supported on the spindle frame and a sprocket bolted to the hub, the guard being generally circular in form and including a non-rotating inboard portion and a rotating outboard portion, the inboard portion being bolted to the spindle housing with bolts that serve to retain the spindle housing on the frame of the crawler and the outboard portion being bolted to the hub with bolts that serve to retain the sprocket on the hub, the inboard and outboard portions each including half shells.

13. A guard kit as set forth in claim 12, wherein the inboard portion has flange elements for receiving the bolts mounting into the spindle housing, said flange elements being disposed inside of said guard.

14. A guard kit as set forth in claim 13, wherein the outboard portion has flange elements for receiving bolts mounting into the hub, said outboard flange elements being disposed outside of said guard.

* * * * *